(12) United States Patent
Hatton et al.

(10) Patent No.: US 9,975,481 B2
(45) Date of Patent: May 22, 2018

(54) METHOD AND APPARATUS FOR ANIMAL PRESENCE ALERT THROUGH WIRELESS SIGNAL DETECTION

(71) Applicant: FORD GLOBAL TECHNOLOGIES, LLC, Dearborn, MI (US)

(72) Inventors: David Anthony Hatton, Berkley, MI (US); Thomas Nelson, Plymouth, MI (US); Hussein F. Nasrallah, Dearborn Heights, MI (US); Johannes Geir Kristinsson, Ann Arbor, MI (US); Krishnaswamy Venkatesh Prasad, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/162,127

(22) Filed: May 23, 2016

(65) Prior Publication Data

US 2017/0334354 A1    Nov. 23, 2017

(51) Int. Cl.
*G08G 1/16* (2006.01)
*B60Q 9/00* (2006.01)
*G08G 1/00* (2006.01)

(52) U.S. Cl.
CPC ............... *B60Q 9/008* (2013.01); *G08G 1/00* (2013.01)

(58) Field of Classification Search
CPC ........ B60Q 9/005; B60Q 9/006; B60Q 9/007; B60Q 9/008; G08G 1/16; G08G 1/166; B60W 2050/008

USPC ......... 340/435, 436, 438, 901, 573.1, 573.3; 701/300, 301

See application file for complete search history.

(56) References Cited

U.S. PATENT DOCUMENTS

| | | | |
|---|---|---|---|
| 5,515,026 A * | 5/1996 | Ewert ................... | B60Q 1/525 116/22 A |
| 7,113,098 B1 * | 9/2006 | Hayes .................. | A01M 29/18 340/573.2 |
| 7,908,060 B2 | 3/2011 | Basson et al. | |
| 8,525,694 B2 | 9/2013 | Schunder | |
| 9,188,449 B2 | 11/2015 | Biswal et al. | |
| 9,649,979 B2 * | 5/2017 | Sakai ..................... | B60Q 9/008 |
| 2003/0194079 A1 * | 10/2003 | Scott ....................... | G06Q 10/10 379/245 |
| 2006/0063540 A1 * | 3/2006 | Beuck ................... | G01S 5/0027 455/456.3 |
| 2007/0035622 A1 * | 2/2007 | Hanna ................ | G06K 9/00771 348/143 |
| 2008/0097700 A1 * | 4/2008 | Grimm .................. | G08G 1/166 701/301 |
| 2011/0241885 A1 * | 10/2011 | Chamberlain ....... | A01K 11/006 340/573.3 |
| 2013/0060400 A1 * | 3/2013 | Hahne .................... | G08G 1/161 701/1 |

(Continued)

*Primary Examiner* — Hung T Nguyen
(74) *Attorney, Agent, or Firm* — Jennifer Stec; Brooks Kushman P.C.

(57) ABSTRACT

A system includes a processor configured to detect a wireless signature indicating an animal presence within a predefined proximity to a vehicle. The processor is also configured to issue an alert to vehicle occupants responsive to the wireless signature detection, the alert varying based on detected signal strength. The wireless signature may be transmitted from a BLE or RFID device provided to an animal affixed to a collar, for example, or from an RFID chip embedded in an animal.

13 Claims, 5 Drawing Sheets

(56) References Cited

U.S. PATENT DOCUMENTS

| | | | |
|---|---|---|---|
| 2013/0285815 A1* | 10/2013 | Jones, II | A01K 11/008 340/573.3 |
| 2015/0127215 A1 | 5/2015 | Chatterjee | |
| 2015/0145660 A1* | 5/2015 | Sumi | B60Q 5/008 340/435 |
| 2015/0232065 A1 | 8/2015 | Ricci et al. | |

* cited by examiner

METHOD AND APPARATUS FOR ANIMAL PRESENCE ALERT THROUGH WIRELESS SIGNAL DETECTION

TECHNICAL FIELD

The illustrative embodiments generally relate to a method and apparatus for animal presence alert through wireless signal detection.

BACKGROUND

Vehicle sensor systems have improved greatly over the years. Many vehicles now come with backup cameras and some form of object detection, such that drivers can avoid backing into objects or people. While these systems greatly reduce accidents and injuries, small animals, such as pets, are still capable of hiding around regions of the vehicle that are not equipped with such sensors (such as behind a tire). It is a tragedy when a driver backs over an unseen family pet.

Instances of wearables for animals have recently been on the rise. People can affix geo-location devices to pet collars and/or pet cameras to track and record what the pet sees. Similar technology can provide a signal to a pet-door, allowing the door to function only for a designated animal.

SUMMARY

In a first illustrative embodiment, a system includes a processor configured to detect a wireless signature indicating an animal presence within a predefined proximity to a vehicle. The processor is also configured to issue an alert to vehicle occupants responsive to the wireless signature detection, the alert varying based on detected signal strength.

In a second illustrative embodiment, a computer-implemented method includes issuing an alert to vehicle occupants responsive to detection of a wireless signal corresponding to an animal identification tag being detected by a vehicle wireless receiver, the alert including a determined signal location relative to a vehicle location.

In a third illustrative embodiment, a system includes a processor configured to detect a wireless signature indicating an animal presence within a predefined proximity to a vehicle. The processor is also configured to contact a remote animal identification database. The processor is further configured to determine if the animal, identifiable by the wireless signature, has been designated as missing and, responsive to determining that the animal has been designated as missing, provide owner contact information, received from the identification database, to vehicle occupants.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
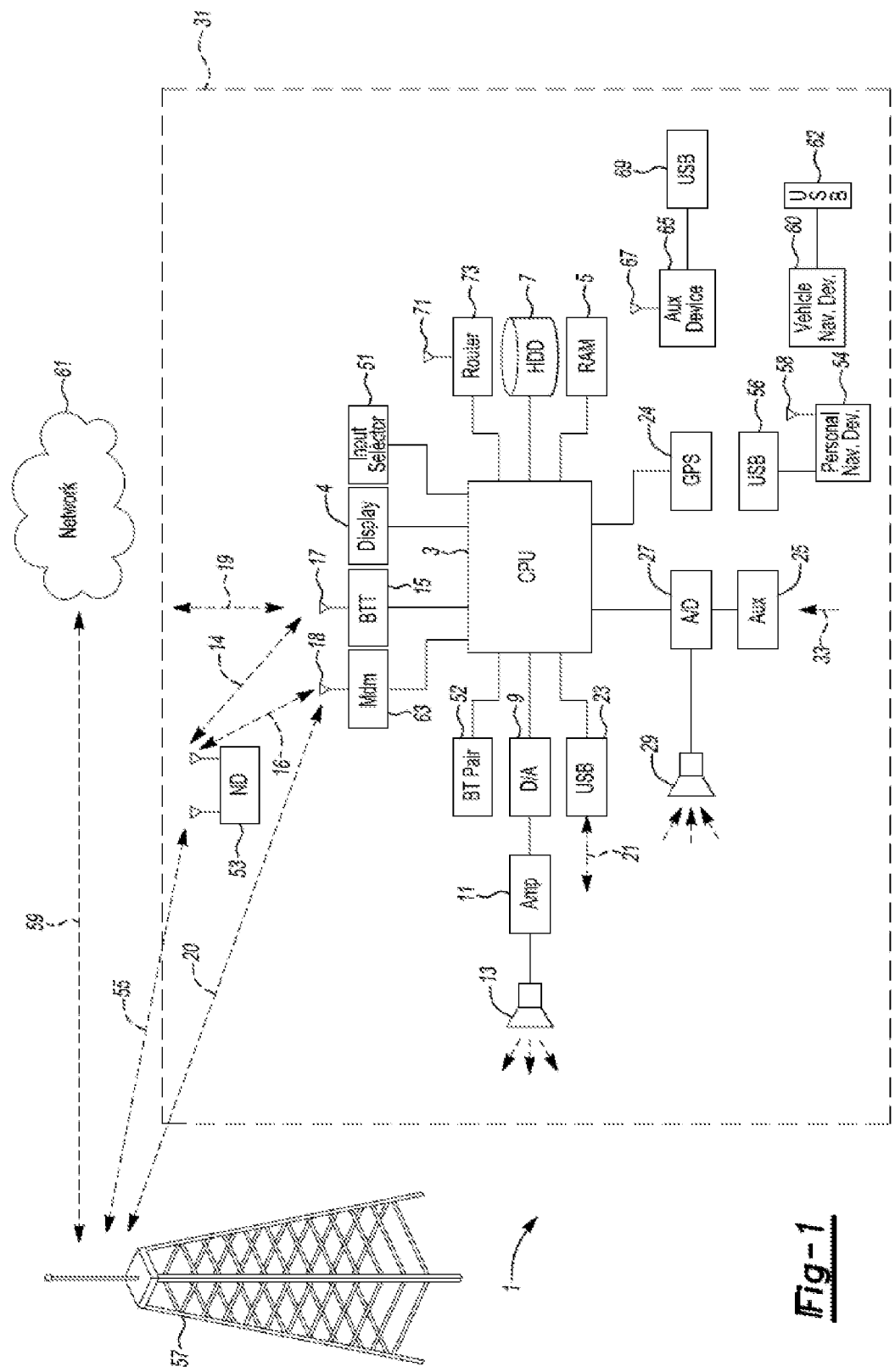
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. It is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having representative processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

The illustrative embodiments may include a wearable device affixable to a pet collar, for example. An RF, BLUETOOTH or other signal from a wearable device can be detected by the vehicle, and can be triangulated by multiple sensors placed at different vehicle locations. If a vehicle is moving towards a signal, or if the signal is generally detected in proximity to the vehicle, the driver can be alerted of the presence of an animal, greatly diminishing the chances of accidentally running the animal over.

With some forms of wireless detection, proximity can be estimated, so an animal that is in very close proximity to a vehicle can cause the vehicle to cease moving until the animal can be cleared away.

The device placed on the collar can be a small BLE or RFID device (as two examples). The device may include a unique identification to specifically identify a pet. If neighbors have similarly equipped vehicles or pets, these systems can also be used to avoid injuring a neighbor's pet. In many of these devices, signal strength can be used to detect proximity to the vehicle. If, for example, an animal is within 20 feet, a low-grade alert may be issued. If the animal closes to within 10 feet, the alert condition may upgrade, and, for example, if the animal closes to within a foot or two, the vehicle could actually be brought to a halt. These are illustrative boundaries only, but they demonstrate how these devices can actively help avoid injuring animals.

Figure 2:
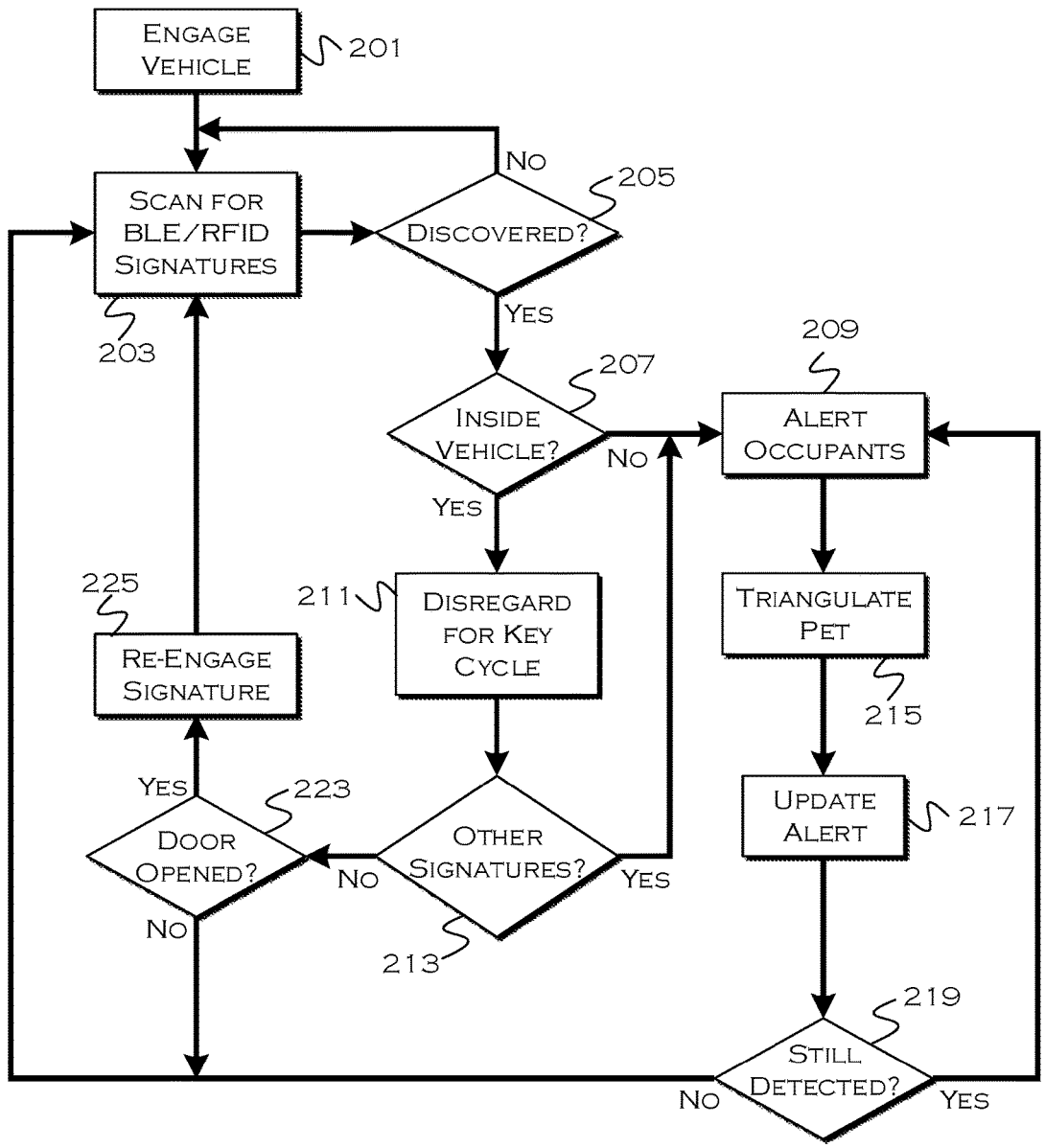
FIG. 2 shows an illustrative example of an animal detection process.

FIG. 2 shows an illustrative example of an animal detection process. With respect to the illustrative embodiments described in this figure, it is noted that a general purpose processor may be temporarily enabled as a special purpose processor for the purpose of executing some or all of the illustrative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process beings when a vehicle is powered 201. The process will scan for any BLE/RFID (or other wireless) signatures indicating the presence of a pet wearing a device 203. If no pets are discovered 205, the scanning may continue. In some embodiments t the scanning will be disabled when a vehicle leaves a home-proximity or achieves a certain speed. In other embodiments, the scanning is enabled for an entire journey, especially if traveling through neighborhoods or other locales where other pets with similar devices detectable by the vehicle may be present.

If a signal is detected by the scanning, the process may determine if the signal is coming from inside the vehicle 207. To determine if a pet is in the vehicle, a user may be queried or a detection unit may be installed at one or more vehicle interior locations that will enable detection of whether the pet is in the vehicle. If the animal is inside the vehicle 207, the particular radio signature associated with that animal may be disregarded for the present key-cycle. Alternatively, the signature may be disregarded for as long as the animal is detected by the interior detection device. If the animal exits the vehicle, detection for that signature may be re-enabled, since the interior detection device would no longer detect the signature (or at least not detect the signature in such proximity as to indicate the animal is inside the vehicle).

If the animal detected is not inside the vehicle, or if other wireless signatures are presented outside the vehicle 213, the process may alert the vehicle occupants 209. This can include displaying an alert on a vehicle display, sounding an interior alarm to alert the occupants and/or an exterior alarm to scare the animal from the vehicle's path, and ceasing vehicle movement if the animal is detected in very close proximity.

Multiple receivers deployed at different exterior locations can be used to triangulate an animal location 215. The animal location may be based on received signal strength for various sensors. In another example, the sensor receiving the highest signal strength can be assumed to be the most proximate and can be used to approximate the animal location. In some embodiments only a single exterior receiver is employed.

Once a rough approximation of animal location is determined, the alert can be updated 217 to reflect an animal position. This tracking and alert update can repeat as long as the animal is still detected in proximity 219, until the animal is either clear of the vehicle or has been placed in detectable range of a vehicle interior sensor (i.e., has been brought into the vehicle). In this example, if the vehicle does not include interior detection, an occupant may be queried as to whether the animal is inside the vehicle. In such a case, the animal signature may be disregarded based on information provided by the occupant. In such a case, if a vehicle door is opened 223 the process may re-engage the detection for the signature or clear all ignore notices 225. This can avoid a situation where a quick pet dashes from an open door to behind a vehicle, and the vehicle is presently ignoring the signature.

Figure 3:
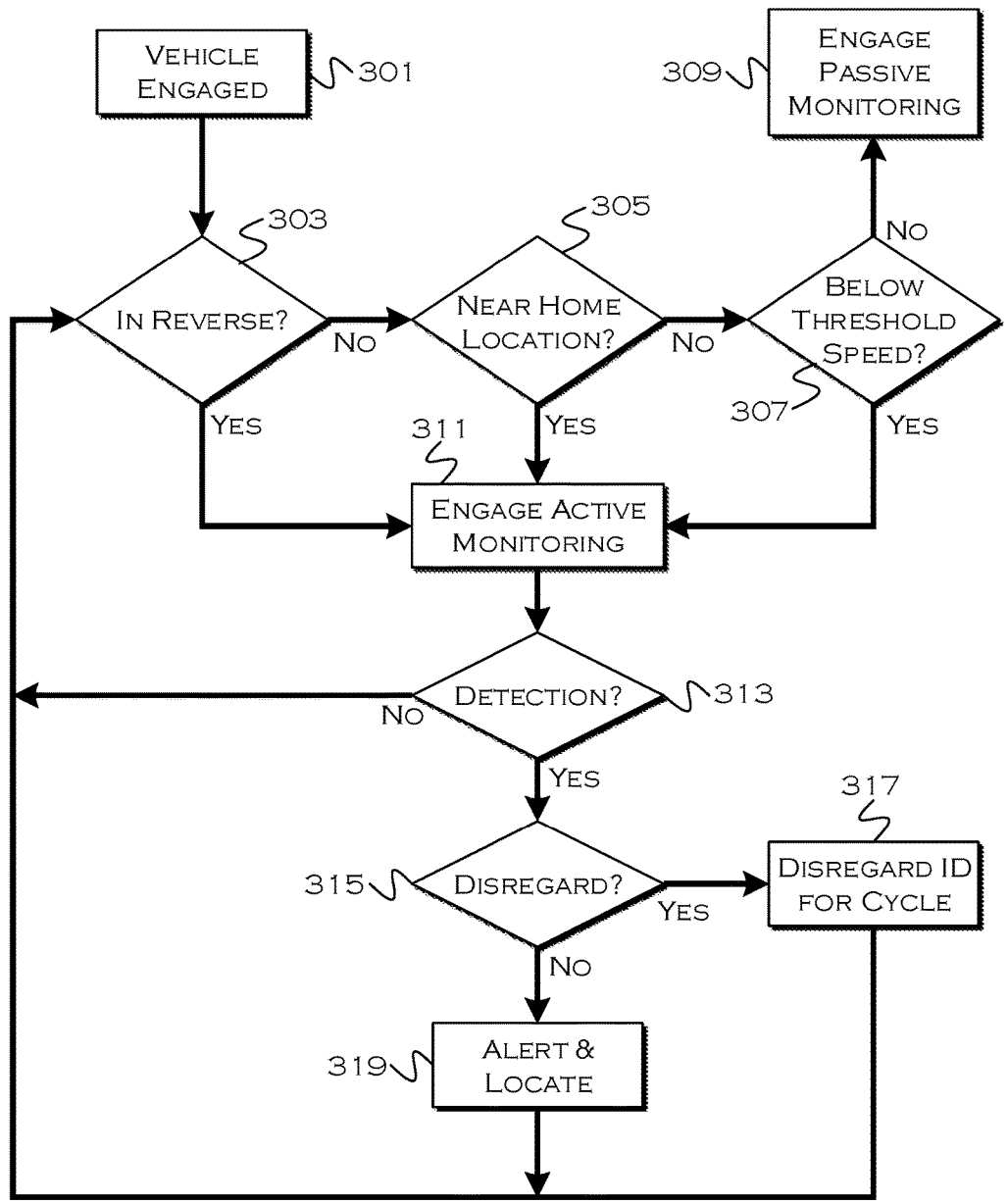
FIG. 3 shows an illustrative example of a monitoring engagement process.

FIG. 3 shows an illustrative example of a monitoring engagement process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process again begins when the vehicle is keyed on. Since most accidents involving family pets will occur at low speeds and soon into a journey (such as when a vehicle is in a neighborhood or driveway), the process will check on key-on to determine a present vehicle location to determine if monitoring should be engaged. In this example, any time the vehicle is in reverse 303, near a home location (traveling forward or in reverse) 305 or traveling below a threshold speed (indicating likely neighborhood travel) 307, the process will engage in active monitoring 311. Active monitoring can include tracking detected animal location, reporting detected animals and providing images of an area where an animal is detected through vehicle cameras (if available). If none of the active monitoring conditions are met, the process may proceed with passive monitoring 309, which could take the form of alerting a driver that an animal is nearby while the vehicle is traveling. Active monitoring could also cause an NFC transponder to ping for RFID devices.

If an animal is detected during active monitoring 313, the process can determine if the detected signature should be disregarded (as in FIG. 2, for example). If the signal is marked as disregarded (through interior detection or occupant indication, for example), the signal may be disregarded for the present key-cycle 317. If the signal is not disregarded, the process may attempt to determine an approximate animal location 319 using signals from multiple sensors, a most-proximate sensor, etc. and provide the appropriate alert.

Any suitable alert may be given and may include distance from the vehicle, approximate location around the vehicle and animal identification if known from the signature. For animal identification, family (and neighbor) pets could be saved locally, or the signature could be sent to the cloud for a lookup based on an identification saved with respect to the animal. In some instances, if the owner has reported the animal as missing, the alert may include a "missing" designation and a contact number to assist in finding missing pets.

The alert can also increase in visual (get brighter, flash, etc.) or audible (get louder, repeat more often, etc.) intensity as the animal proximity to the vehicle decreases. The alert can be an interior or exterior alert (through exterior speakers or sounding a horn, for example) with the exterior alert including a signal designed to scare the animal from a vehicle path. Since the owner may want to retrieve the animal, the exterior alert may only trigger if the animal is in immediate danger (i.e. within a predetermined distance and/or in the path of a vehicle). In some embodiments, a first alert for animals within a certain distance may be visual, and a second alert for animals within a closer proximity may be provided.

Figure 4:
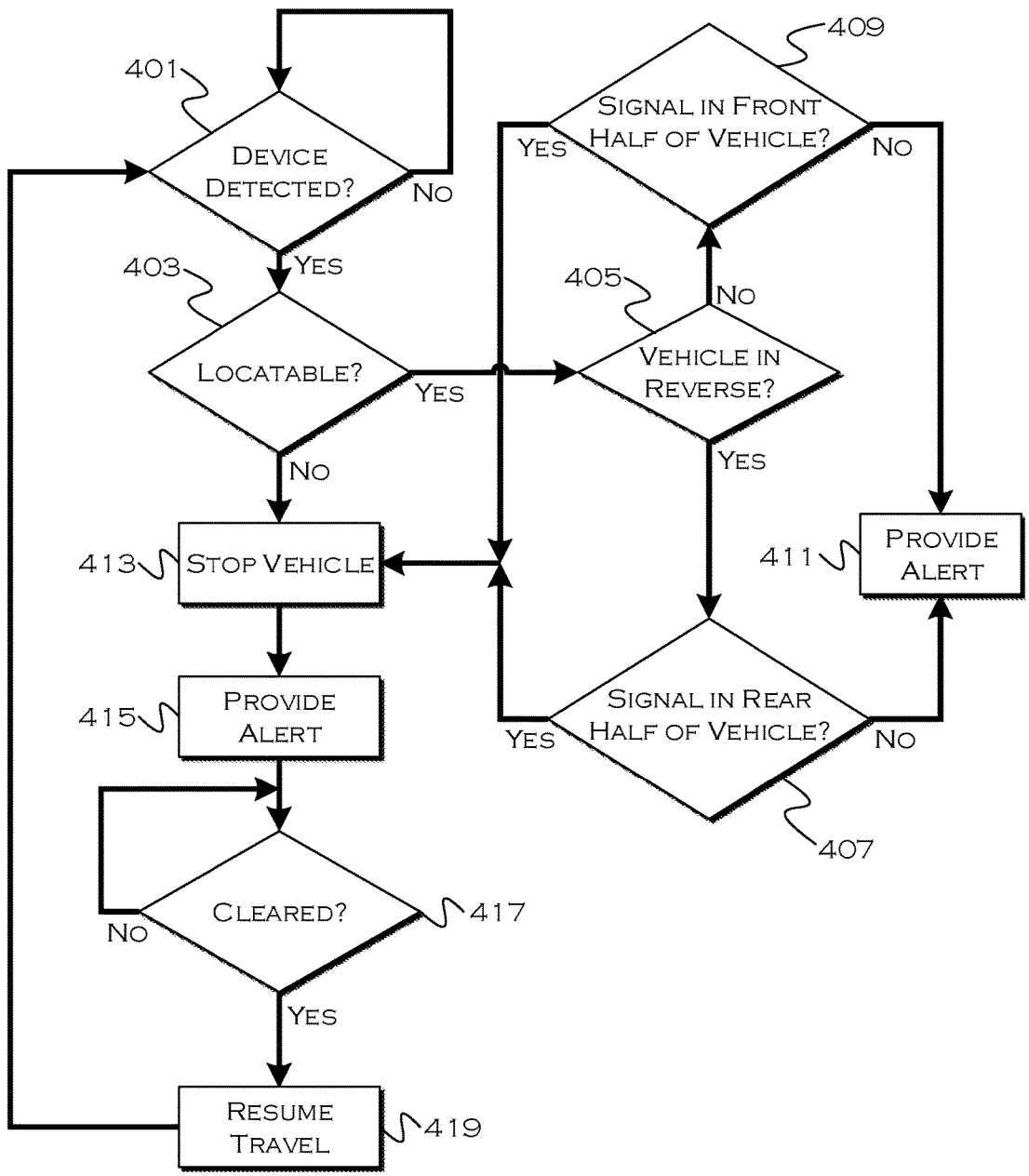
FIG. 4 shows an illustrative example of an alert process.

FIG. 4 shows an illustrative example of an alert process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process determines if a device has been detected in proximity to the vehicle such that an alert should be issued 401. For example, if a device is detected 40 feet from the vehicle, no alert may be issued (as a non-limiting example).

If an alert should be issued, the process determines if the device is also locatable using vehicle sensor locations, signal strength, or other suitable location determination. If the device is not locatable, but is within a predefined proximity (or an unknown proximity), the process will stop the vehicle from moving 413. While not a necessary step, this can assist in avoiding accidentally running over an animal while the alert process is in progress.

An alert is then issued 415, and the vehicle is prevented from movement until the driver or other occupant has cleared the alert 417. The alert can be cleared through interaction with a vehicle computing system, or may be automatically cleared if the animal moves out of the threshold proximity to the vehicle. Travel may then resume 419.

If the detected signature is locatable using the appropriate location methods 403, the process will determine if the vehicle is presently in reverse 405. If the vehicle is in reverse and the signature is detected rearwards of the front tires 407, the process may again stop the vehicle. If the animal is in front of the front tires, and more than a threshold distance from the vehicle, the process may issue an alert 411 since likelihood of running over the animal located forward of the tires while the vehicle is in reverse is low. In this example, the vehicle ceases movement if the animal is detected in or within a range of a particular location.

If the vehicle is not in reverse and the signal is detected forward of the rear tires 409, the process may stop the vehicle because the animal is at risk of being hit. As before, this may also be contingent on the animal being within a threshold distance from the vehicle. If the animal is rearward of the rear tires and the vehicle is moving forward, the process may only issue an alert 411. At any point, if the location of the locatable device changes such that the animal may be hit or is likely not to be hit, the process can stop the vehicle or clear a stopped state, respectively.

Figure 5:
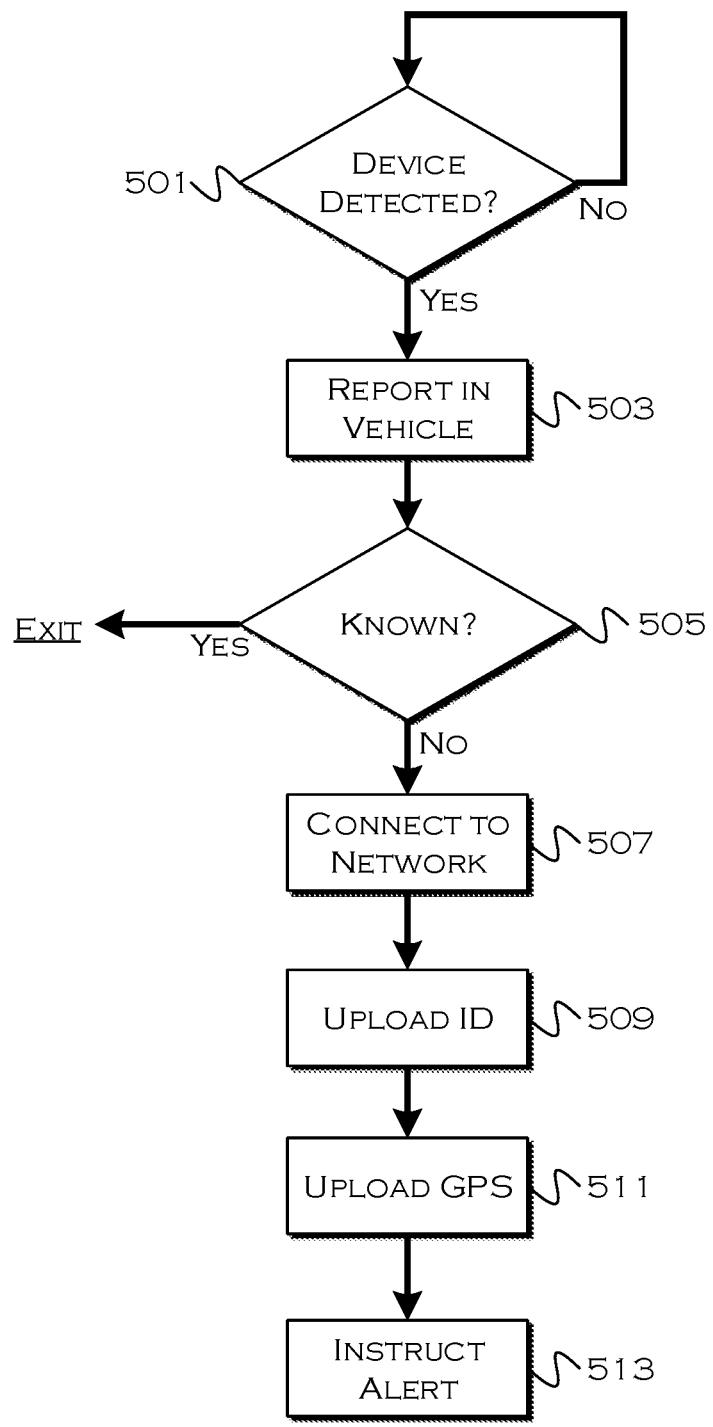
FIG. 5 shows an illustrative example of an alert broadcast process.

FIG. 5 shows an illustrative example of an alert broadcast process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process detects a device signature in proximity to the vehicle 501. To prevent contact with the animal, the alert is issued inside the vehicle. Also in this example, the process determines if the animal identity is known 505. As previously noted, family animals and/or other local animals may be stored locally on the vehicle. A cloud-based database can also be used to lookup an animal identity.

If the animal owner and vehicle owner match, the process may ignore reporting the animal to the owner through the remainder of the FIG. 5 process even if the animal identification is not stored locally. In another example of matching the animal to the vehicle owner, the animal home address is compared to the vehicle owner home address, both of which may be known by the same or different remote databases that are controlled by a similar entity.

If the animal has been designated as missing, the system may alert the occupants and provide information for contacting a registered animal owner as stored in the remote database. The process can also report the animal location and known animal identification directly to the owner, regardless of whether the animal is missing or not. If the animal is not a known animal or other expected local animal, then in this example the process connects to a network 507 and uploads the detected identification signature 509. A GPS location of the vehicle can also be uploaded, to provide a rough approximation of animal location.

Then, in this example, the process can instruct an alert to be issued (via the remote server, for example) to the animal owner 513. This can provide the animal identification and GPS coordinates to the owner, so that the owner knows that their animal is in a neighbor's or stranger's yard. The process allows for disregarding reporting for animals expected to be in vehicle proximity, so as to avoid unnecessary reporting of family animals to the driver or occupants.

Through use of the illustrative embodiments, animal proximity to vehicles and location around vehicles can be tracked and reported to a driver. Missing animals can also be found through the illustrative embodiments, and generally it is likely that fewer animals will be injured or killed if their owners equip the animals with the detectable collar accessory.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
detect a wireless signal indicating presence of an animal within a predefined proximity to a vehicle;
issue a vehicle-based alert responsive to the wireless signal detection, the alert varying based on detected signal strength; and determine if the animal is related to the vehicle based on a stored association, and when the animal is not related to the vehicle, upload an animal identification, determined based on the wireless signal, and current vehicle GPS coordinates in conjunction with an owner-alert instruction to alert a registered animal owner.

2. The system of claim 1, wherein the processor is configured to determine if the animal is located within the vehicle based on an interior vehicle sensor and responsively disable alerts for any animal determined to be inside the vehicle.

3. The system of claim 1, wherein the processor is configured to determine an approximate animal location based on received signal strength at multiple receivers and include the approximate animal location with the alert.

4. The system of claim 1, wherein the alert increases in intensity varying correspondingly with animal proximity to the vehicle.

5. The system of claim 1, wherein the alert includes an exterior audible sound played through an exterior speaker.

6. The system of claim 1, wherein the processor is configured to cease vehicle movement if the animal is determined to be within the predefined proximity to the vehicle.

7. The system of claim 1, wherein the processor is configured to cease vehicle movement if the animal is determined to be detected in a particular location with respect to the vehicle and the vehicle is moving in a direction corresponding to encountering the location.

8. The system of claim 7, wherein the detected location is forward of vehicle rear tires and the vehicle is moving forward.

9. The system of claim 7, wherein the detected location is rearward of vehicle front tires and the vehicle is moving in reverse.

10. The system of claim 1, wherein the processor is configured to provide the animal identification in conjunction with the alert.

11. The system of claim 10, wherein the processor is configured to query a remote database to determine the animal identification based on the wireless signature.

12. A system comprising:
a processor configured to:
detect a wireless signal indicating presence of an animal within a predefined proximity to a vehicle;
contact a remote animal identification database;
determine if the animal, identifiable by the wireless signal, has been designated as missing; and
responsive to determining that the animal has been designated as missing, provide owner contact information received from the identification database to vehicle occupants.

13. The system of claim 12, wherein the processor is further configured to provide vehicle GPS coordinates to a remote reporting system for use in reporting an animal location.

* * * * *